(12) United States Patent
Tashiro

(10) Patent No.: US 12,039,206 B2
(45) Date of Patent: Jul. 16, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hideyasu Tashiro, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/321,046

(22) Filed: May 22, 2023

(65) Prior Publication Data

US 2023/0409248 A1    Dec. 21, 2023

(30) Foreign Application Priority Data

Jun. 15, 2022   (JP) .................... 2022-096548

(51) Int. Cl.
  *G06F 3/12*   (2006.01)
  *G06T 3/04*   (2024.01)
  *G06T 7/00*   (2017.01)

(52) U.S. Cl.
  CPC .......... *G06F 3/1204* (2013.01); *G06F 3/1208* (2013.01); *G06F 3/121* (2013.01);
  (Continued)

(58) Field of Classification Search
  CPC ...... G06F 3/1204; G06F 3/1208; G06F 3/121; G06F 3/1256; G06T 3/0012; G06T 7/001; G06T 2200/24; G06T 2207/20092; G06T 2207/30144; G06T 2207/30176; G06T 2207/10152; G06T 2207/10024; G06T 7/11; G06T 7/13; G06T 2207/10056; G06T 2207/30024; G06T 3/0068; G06T 7/0016; G06T 7/60; G06T 7/90; G06T 7/30; G06T 7/0002; G06T 2207/30164; G06T 7/586; G06T 7/00; G06T 2207/30108; G06T 7/0004; G06T 7/0006; G06T 7/0008; G06T 1/00; G06T 1/0007; G06T 1/20; G06T 11/00; G06T 2200/08; G06T 2207/10012; G06T 2207/10016; G06T 2207/20084; G06T 2207/30168; G06T 3/00; G06T 5/005; G06T 7/0012; G06T 7/70;

(Continued)

(56) References Cited

U.S. PATENT DOCUMENTS 8,600,165 B2 * 12/2013 Saubat ................. G06V 30/147
                                                        382/181
10,361,802 B1 * 7/2019 Hoffberg-Borghesani ..................
                                                        G06F 3/00

(Continued)

FOREIGN PATENT DOCUMENTS

JP    2017-001324 A    1/2017

*Primary Examiner* — Negussie Worku
(74) *Attorney, Agent, or Firm* — Venable LLP

(57) ABSTRACT

An image processing apparatus includes one or more memories storing instructions, and one or more processors executing the instructions to obtain document data before printing, to set an inspection area that is an inspection target for an image represented by the obtained document data, to update, in a case when the document data is modified, the set inspection area based on the modified document data, and to generate, based on the modified document data, a reference image for inspection of a printed material.

17 Claims, 12 Drawing Sheets

(52) U.S. Cl.
CPC .............. *G06F 3/1256* (2013.01); *G06T 3/04* (2024.01); *G06T 7/001* (2013.01); *G06T 2200/24* (2013.01); *G06T 2207/20092* (2013.01); *G06T 2207/30144* (2013.01); *G06T 2207/30176* (2013.01)

(58) Field of Classification Search
CPC . G06T 2207/10068; G06T 2207/10081; G06T 2207/10088; G06T 2207/10148; G06T 2207/20081; G06T 2207/30061; G06T 2207/30152; G06T 7/136; G06T 7/40; G06T 7/74; G06T 7/80; G06T 7/97; G01N 21/27; G01N 23/225; G01N 23/2251; G01N 23/227; G01N 33/56911; G01N 21/8851; G01N 21/88; G01N 21/8806; G01N 2021/8887; G01N 21/31; G01N 21/94; G01N 2021/8861; G01N 2021/8858; G01N 21/89; G01N 21/95; G01N 2021/8466; G01N 2021/945; G01N 21/00; G01N 21/01; G01N 21/255; G01N 21/274; G01N 21/8901; G01N 2201/0616; G01N 33/0098; G01N 2015/0693; G01N 21/51; G01N 21/892; G01N 21/9027; G01N 21/952; G01N 21/956; G01N 23/04; G01N 2021/0112; G01N 2021/8848; G01N 2021/8854; G01N 21/90; G01N 21/9501; G01N 21/9508; G01N 21/954; G01N 21/958; G01N 2201/0245; G01N 23/02; G01N 2021/8816; G01N 2021/8835; G01N 2021/8883; G01N 21/03; G01N 21/9072; G01N 21/95607; G01N 2201/1296; G01N 23/046; H04N 17/002; H04N 7/18; H04N 1/00411; H04N 1/0044; H04N 1/00816; H04N 1/00824; H04N 1/00827; H04N 1/193; H04N 1/19594; H04N 2201/042; H04N 23/16; H04N 23/55; H04N 23/56; H04N 23/617; H04N 23/631; H04N 23/633; H04N 23/635; H04N 23/661; H04N 5/222; H04N 17/00; H04N 23/60; H04N 23/74; H04N 23/80
USPC .......................................................... 358/474
See application file for complete search history.

(56) References Cited

U.S. PATENT DOCUMENTS

| | | | | |
|---|---|---|---|---|
| 11,941,307 | B2* | 3/2024 | Gutierrez | G06F 3/1284 |
| 2002/0009220 | A1* | 1/2002 | Tanaka | G06T 7/0002 |
| | | | | 382/150 |
| 2007/0237385 | A1* | 10/2007 | Kato | G01N 21/9501 |
| | | | | 382/149 |
| 2014/0177016 | A1* | 6/2014 | Wilsher | H04N 1/0005 |
| | | | | 358/406 |
| 2018/0288280 | A1* | 10/2018 | Bermundo | H04N 1/4446 |
| 2020/0019353 | A1* | 1/2020 | Okajima | G06F 3/1257 |
| 2020/0112651 | A1* | 4/2020 | Shimura | G06F 3/1239 |
| 2020/0288030 | A1* | 9/2020 | Tsukamoto | H04N 1/00803 |
| 2022/0116504 | A1* | 4/2022 | Tsukamoto | G06T 1/0007 |
| 2023/0061533 | A1* | 3/2023 | Sakai | G06T 7/0002 |
| 2023/0122294 | A1* | 4/2023 | Tanaka | G06F 3/1208 |
| | | | | 358/1.15 |
| 2023/0188651 | A1* | 6/2023 | Muraishi | H04N 1/0044 |
| | | | | 358/406 |

* cited by examiner

```
...
stream
BT /F1 50 Tf 100 100 Td
(ABCDEFGHIJ) Tj ET
endstream
...
stream
BT /F1 50 Tf 100 2500 Td
(VWXYZ) Tj ET
endstream
...
stream
...BINARY DATA OF IMAGE...
endstream
...
```

DESCRIPTION DATA OF OBJECT 501

DESCRIPTION DATA OF OBJECT 502

DESCRIPTION DATA OF OBJECT 503

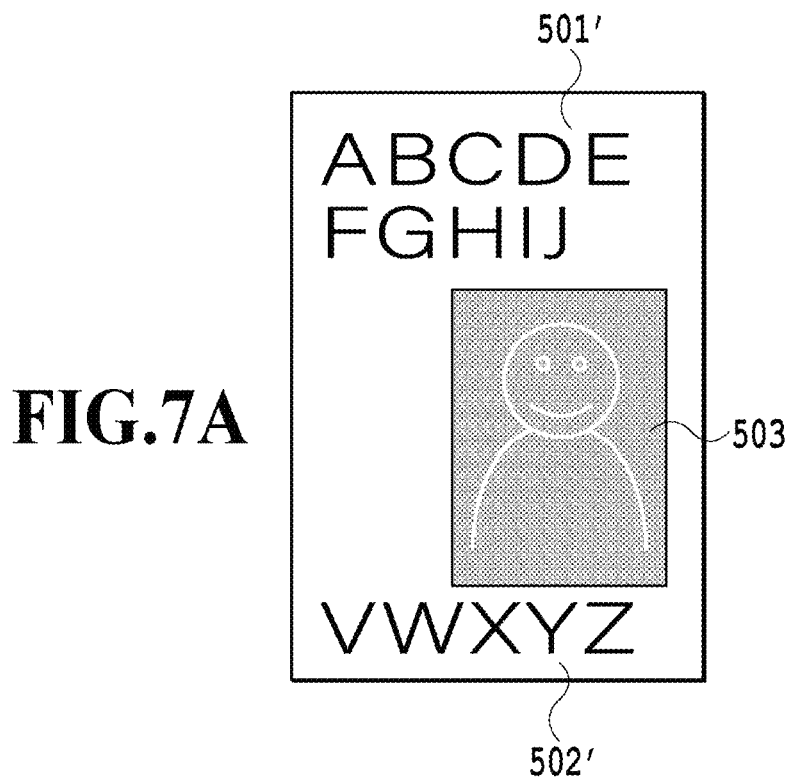

IMAGE PROCESSING APPARATUS, IMAGE PROCESSING METHOD, AND STORAGE MEDIUM

CROSS REFERENCE TO PRIORITY APPLICATION

This application claims the benefit of Japanese Patent Application No. 2022-096548, filed Jun. 15, 2022, which is hereby incorporated by reference herein in its entirety.

BACKGROUND

Field

The present disclosure relates to an inspection technique of a printed material.

Description of the Related Art

There is a case when soiling occurs in a printed material that is output from a printing apparatus, which is caused by a color material, such as ink and toner, sticking to an unintentional portion or the like. Alternatively, there is a case when a sufficient amount of color material does not stick to the portion, at which an image is to be formed and color voids in which the color becomes paler than the original color occur. The print defect, such as soiling and color voids, reduces the quality of a printed material. Because of this, it is required to secure the quality of a printed material by inspecting the presence/absence of a print defect. The visual inspection to visually inspect the presence/absence of a print defect requires much time and cost, and, therefore, an inspection system performing inspection automatically without relying on visual inspection has been proposed. In the inspection system such as this, a reference image that is used as an inspection reference is generated and registered in advance from document data that is used for printing processing and for the reference image, an area for which detection of a print defect is performed (inspection area) is set in advance. Then, an inspection-target image (inspection image) obtained by scanning a printed material output from a printing apparatus and the registered reference image are compared by taking the inspection area that is set in advance as a target and the presence/absence of a print defect is inspected based on the difference between the two images. In this case, the generation of the reference image is implemented by interpreting PDL (Page Description Language) included in the document data by a RIP (Raster Image Processor) and converting into a page image. Then, in the process of the transformation processing by the RIP, a positioning error of an image and a graphics, corruption of text, and the like, may occur within the page image, and, therefore, a method of detecting the RIP trouble such as this has been proposed. For example, Japanese Patent Laid-Open No. 2017-001324 has disclosed a method of notifying, in a case when a designated area represented by layout data and a print area represented by variable data do not match in variable printing, a user of this and causing the user to perform editing so that the print area is included within the designated area. In addition to this, there is a method in which transformation processing is performed for one piece of document data by a plurality of RIPs and the difference between a plurality of obtained images (RIP images) is compared, a method in which OCR results (recognized character string) for a RIP image and text data attached to document data area collated, or the like.

The method of Japanese Patent Laid-Open No. 2017-001324 described above prevents trouble that printing is performed with characters, and the like, being printed outside the print area or being lost in variable printing by comparing areas, but it is not possible to detect the trouble in a case when consistency between areas is established. Further, it is no longer possible for the method that utilizes OCR results to detect corruption of text, or the like, because the character and the background cannot be separated appropriately and the OCR accuracy decreases in a case when the color of the background image and the color of the character drawn on the background image in an overlapping manner are similar.

Then, in a case when a user finds the RIP trouble as described above on the way of the setting work of the inspection area, the document data needs to be modified. In this case, it is necessary for the user to perform again the setting of the inspection area from the beginning based on the modified document data, and, therefore, the work burden is heavy.

SUMMARY

The present disclosure has been made in view of the above-described problem and an object thereof is to reduce the burden of a user to perform again the setting work of the inspection area following the modification of document data.

The image processing apparatus according to the present disclosure is an image processing apparatus including one or more memories storing instructions, and one or more processors executing the instructions to obtain document data for printing to set an inspection-target inspection area for an image represented by the obtained document data, and to update, in a case when the document data is modified, the set inspection area based on the modified document data.

Further features of the present disclosure will become apparent from the following description of exemplary embodiments with reference to the attached drawings.

BRIEF DESCRIPTION OF THE DRAWINGS

FIG. 7A is a diagram showing an example of a page image and FIG. 7B is a diagram showing an example of a contents stream of a PDF file;

DESCRIPTION OF THE EMBODIMENTS

Hereafter, with reference to the attached drawings, the present disclosure is explained in detail in accordance with preferred embodiments. Configurations shown in the following embodiments are merely exemplary and the present disclosure is not limited to the configurations shown schematically.

First Embodiment

In the present embodiment, an aspect is explained in which an inspection area that is already set for document data before modification is automatically adjusted based on modified document data.

<Configuration of Entire System>

Figure 1:
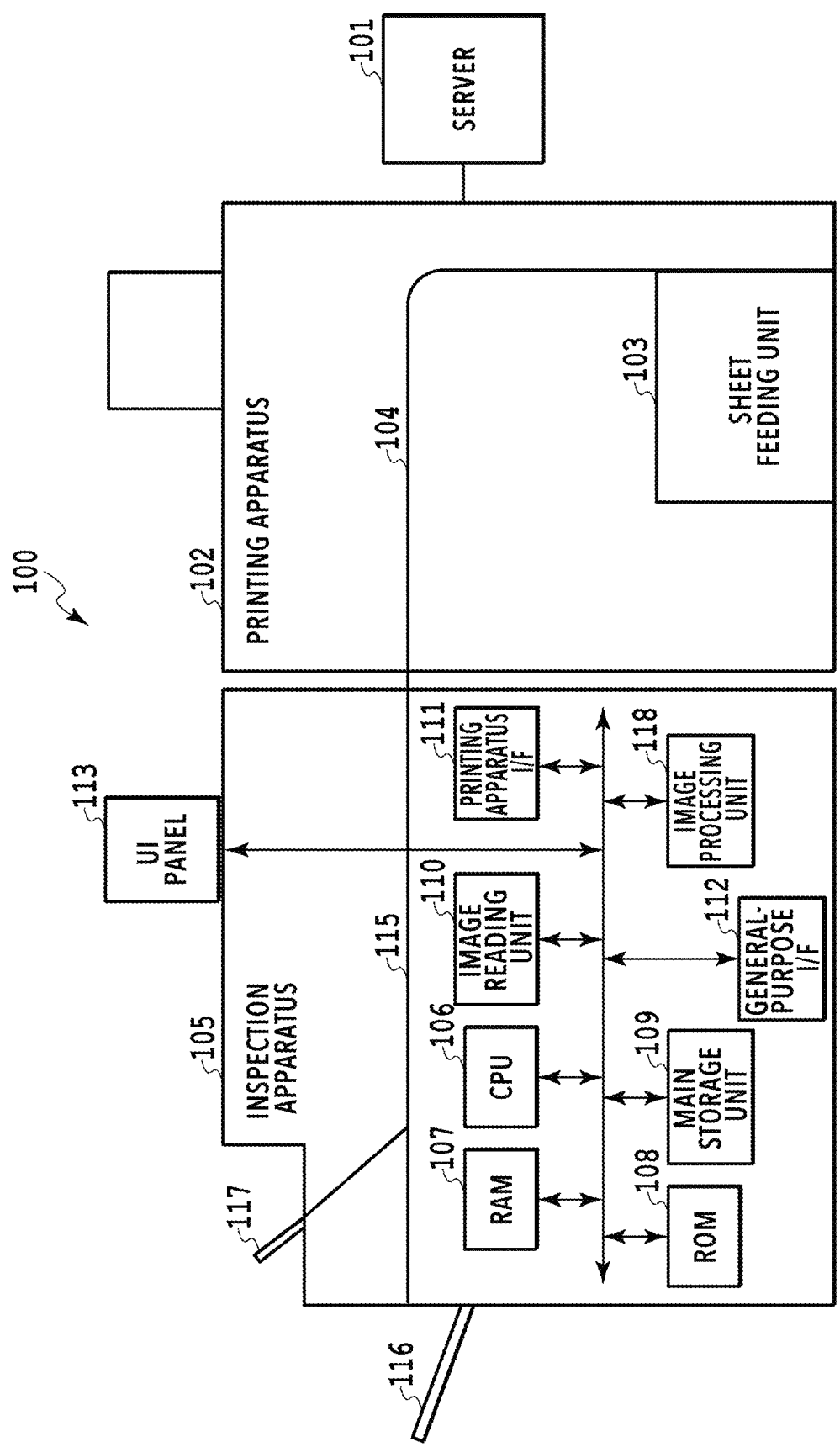
FIG. 1 is a diagram showing an example of a configuration of an inspection system.

FIG. 1 is a diagram showing an example of the configuration of an inspection system according to the present embodiment. An inspection system 100 shown in FIG. 1 comprises a server 101, a printing apparatus 102, and an inspection apparatus 105. In the inspection system 100, based on a print job generated by the server 101, the printing apparatus 102 outputs a printed material by performing printing processing and the inspection apparatus 105 inspects the presence/absence of a defect of the printed material. As the type of print defect that can be inspected, for example, a spot-shaped defect, a linear (streak) defect, a plane-shaped defect, image unevenness, and the like, are included.

The server 101 generates a print job and transmits the generated print job to the printing apparatus 102. To the server 101, a client terminal, not shown schematically, is connected via a network so as to be capable of communication. The server 101 receives a request to generate a print job and the like from the client terminal and generates a print job and inputs the print job to the printing apparatus 102.

The printing apparatus 102 performs printing processing to form an image on a sheet based on the print job received from the server 101. In the present embodiment, a case is supposed where the electrophotographic method is used as the printing method, but the configuration may be one in which another printing method, such as the offset printing method and the ink jet method, is used. The printing apparatus 102 comprises a sheet feeding unit 103. In the sheet feeing unit 103, a sheet in accordance with a purpose is set in advance by a user. In the present specification, a "sheet" is the concept also including a plastic sheet, and the like, and is not limited to paper in a narrow meaning. The printing apparatus 102 conveys the sheet set in the sheet feeding unit 103 along a conveyance path 104 based on the print job received from the server 101 and forms an image on one side or both sides of the sheet and outputs the sheet on which the image is formed (that is, printed material) to the inspection apparatus 105.

The inspection apparatus 105 comprises a CPU 106, a RAM 107, a ROM 108, a main storage unit 109, an image reading unit 110, a printing apparatus I/F 111, a general-purpose I/F 112, a UI panel 113, and an image processing unit 118, and these are connected to one another via a main bus 114. Further, the inspection apparatus 105 comprises a conveyance path 115 connected with the conveyance path 104 of the printing apparatus 102, an output tray 116, and an output tray 117.

The CPU 106 is a processor that controls the entire inspection apparatus 105. The RAM 107 functions as a main memory, a work area, and the like, of the CPU 106. The ROM 108 stores a plurality of programs that are executed by the CPU 106. The main storage unit 109 stores applications that are executed by the CPU 106, data that is used in image processing, and the like. The image reading unit 110 generates a scanned image of an inspection-target printed material that is output from the printing apparatus 102 by performing scan processing to optically read one side or both sides of the printed material. For example, the image reading unit 110 reads one side or both sides of the printed material that is conveyed by using one or more reading sensors (not shown schematically) provided in the vicinity of the conveyance path 115. The reading sensor may be provided only on one side or may be provided on both sides of the obvious side and the reverse side of the printed material that is conveyed for reading both sides at the same time. In the configuration in which the reading sensor is provided only on one side of the printed material, the printed whose one side has been read is conveyed to a both-side conveyance path, not shown schematically, in the conveyance path 115 and the obverse side and the reverse side of the printed material are reversed and the above-described reading sensor reads the other side.

The image processing unit 118 inspects the presence/absence of a print defect by comparing the image obtained by scanning the inspection-target printed material (in the following, called "inspection image") generated in the image reading unit 110 and the image registered in advance (in the following, called "reference image"), which is used as a reference in inspection. Further, prior to the inspection, the setting of an inspection area, or the like, is also performed. The reference image is also called "correct answer image". Details of the image processing unit 118 will be described later.

The printing apparatus I/F 111 adjusts (synchronization processing) timing of processing a printed material that is output from the printing apparatus 102 and notifies each other of the operation situation. The general-purpose I/F 112 is a serial bus interface, such as USB and IEEE 1394. For example, by connecting a USB memory to the general-purpose I/F 112, it is possible to write data, such as a log stored in the main storage unit 109, to the USB memory and take out the USB memory, take in the data stored in the USB memory to the inspection apparatus 105, and so on. The UI panel 113 is, for example, a liquid crystal display (display unit) having a touch panel function. The UI panel 113 functions as the user interface of the inspection apparatus 105 and displays the current situation and setting to notify a user thereof. Further, it is possible for a user to input various instructions by directly operating buttons displayed on the liquid crystal display.

As a whole, the inspection apparatus 105 performs inspection processing, to be explained in the following, based on the inspection image obtained by reading a printed material in the image reading unit 110 and the reference image registered in advance while conveying the printed material that is sent from the printing apparatus 101 through the conveyance path 115. In a case when the results of the inspection processing indicate that the printed material has passed the inspection, the printed material is discharged onto the output tray 111 for passed printed materials and, in a case when the results of the inspection processing indicate that the printed material has failed the inspection, the printed material is discharged onto the output tray for failed printed materials. In this manner, it is possible to collect only the printed materials whose quality has been confirmed as products for delivery on the output tray 116.

<Software Configuration>

Figure 2:
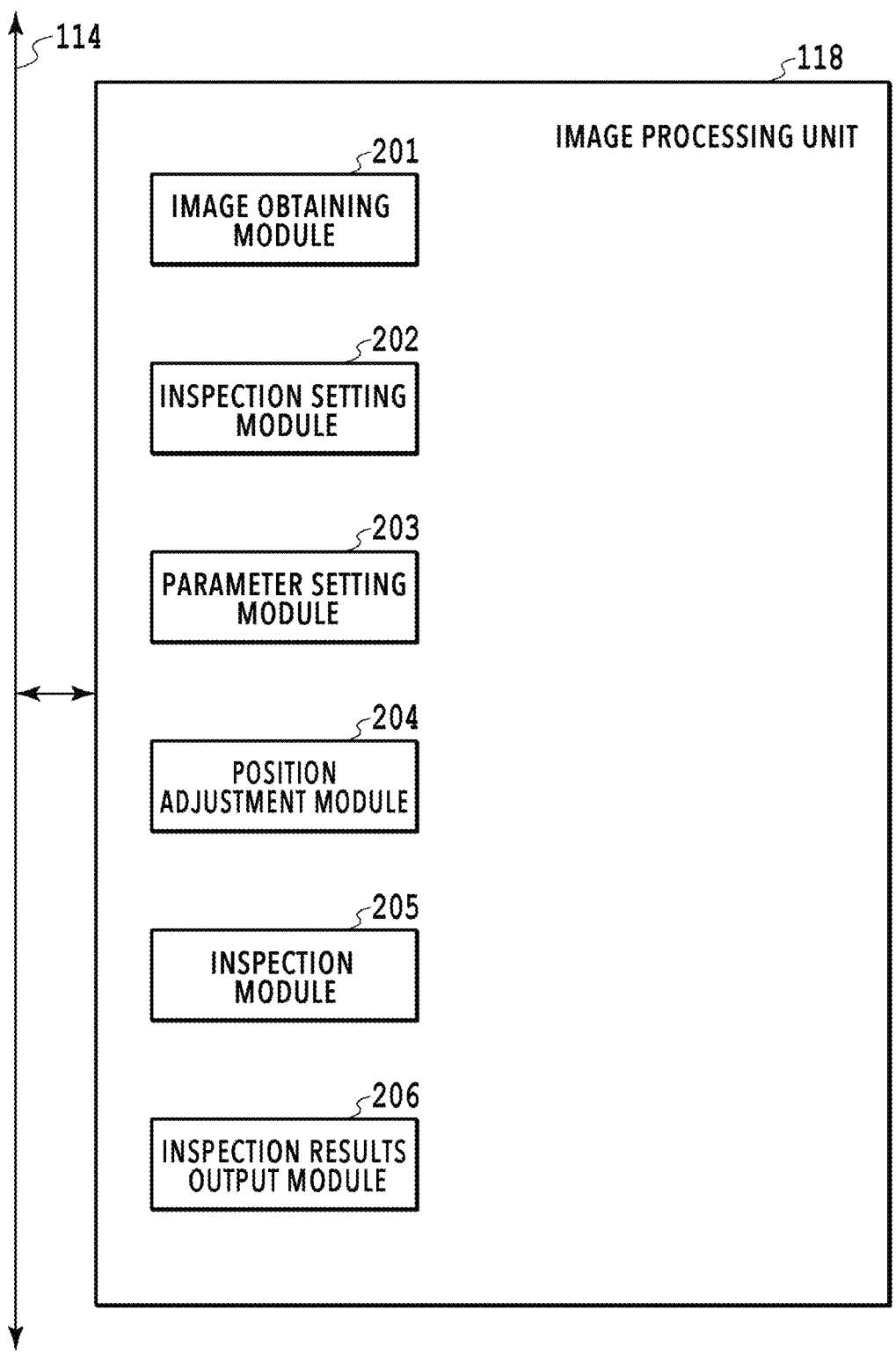
FIG. 2 is a block diagram showing a software configuration for implementing various kinds of processing in an image processing unit of an inspection apparatus.

FIG. 2 is a block diagram showing the software configuration (function configuration) for implementing various kinds of processing in the image processing unit 118 of the inspection apparatus 105. The software configuration shown in FIG. 2 is implemented by the CPU 106 executing programs for implementing the functions thereof. The image processing unit 118 comprises software modules 201 to 207, each in charge of obtaining of an image, setting of an inspection item, setting of an inspection area, position adjustment of an image, setting of inspection parameters, execution of inspection, and output of inspection results. The function in each of these modules is implemented by the CPU 106 reading a program stored in the ROM 108 onto the RAM 107 and executing the program.

The image obtaining module 201 obtains a scanned image (inspection image) of an inspection-target printed material and a reference image that is used as an inspection reference. Here, the reference image is image data in the raster format obtained by interpretating PDL (Page Description Language) included in the print job by the RIP (Raster Image Processor).

The inspection setting module 202 sets conditions relating to inspection based on user selection via a user interface screen for inspection setting, which is displayed on the UI panel 113. Specifically, it is made possible to set conditions, such as which type of print defect is detected (inspection item), which level the inspection accuracy is set to (inspection level), and which range of the inspection image is taken as a target (inspection area). Further, the inspection setting module 202 of the present embodiment also performs processing to automatically adjust the set inspection area in a case when the document data is modified after the inspection area is set. This automatic adjustment of the set inspection area will be described later.

The parameter setting module 203 sets parameters in accordance with the inspection item that is set in the inspection setting module 202. The parameters in this case are a filter for emphasizing a print defect of type selected by a user, a threshold value for determining a print defect, and the like.

The position adjustment module 204 performs position adjustment processing between the inspection image and the reference image. The inspection module 205 performs defect detection processing for the inspection item that is set in the inspection setting module 202. The inspection results output module 206 causes the UI panel 113 to display the results of the defect detection processing performed by the inspection module 205.

<Flow of Inspection Processing>

Figure 3:
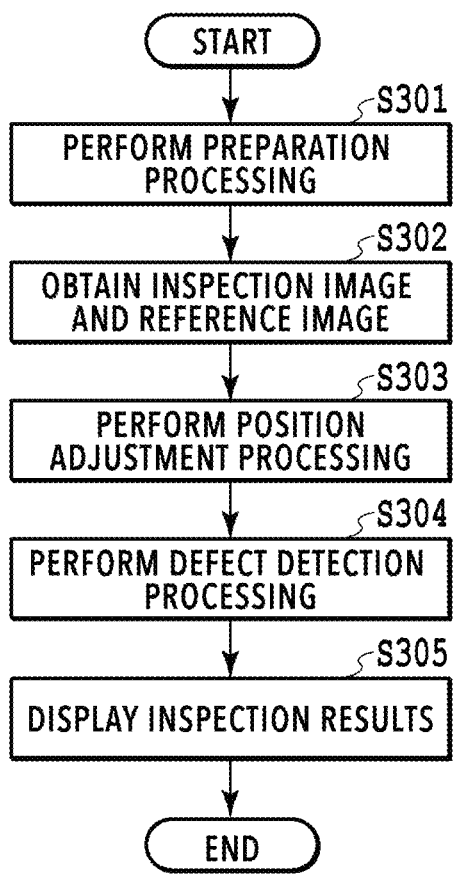
FIG. 3 is a flowchart showing a procedure of inspection processing that is performed by the image processing unit.

FIG. 3 is a flowchart showing a procedure of inspection processing that is performed by the image processing unit 118. The series of processing shown in the flowchart in FIG. 3 is implemented by the CPU 106 reading a program stored in the ROM 108 onto the RAM 107 and executing the program. In the following explanation, a symbol "S" means a step.

At S301, preparation processing is performed. Specifically, based on user selection, processing, such as setting of an inspection item, setting of parameters corresponding to the inspection item, and setting of an inspection area, is performed by the software modules 202 and 203 in charge of the processing. The setting processing of an inspection area, which is the characteristic of the present embodiment, will be described later.

At S302, the image obtaining module 201 obtains the inspection image generated by the image obtaining module 201 reading the printed material that is output from the printing apparatus 102 with the image reading unit 110 and the reference image that is registered in the preparation processing at S301. In order to obtain the inspection image, it may also be possible to obtain the inspection image sequentially by synchronizing the reading operation in the image reading unit 110 with the printed material that is conveyed, or it may also be possible to obtain the inspection image that is read in advance and stored in the main storage unit 109. The reference image is, as will be described later, image data in the raster format obtained by interpreting PDL included in the document data of the print job that is transmitted from the server 101 and is obtained from the RAM 107 or the main storage unit 109.

At S303, the position adjustment module 204 performs position adjustment processing between the inspection image and the reference image, both obtained at S302. Specifically, for the inspection image, position adjustment by linear transformation, such as affine transformation, position adjustment by non-linear transformation, such as free-form deformations (FFD), or the like, is performed.

At S304, the inspection module 205 performs defect detection processing for the inspection item that is set in the preparation processing at S301. A rough flow of the defect detection processing is as follows. First, a difference image indicating the difference between the inspection image for which the position adjustment has been performed and the reference image is generated. For example, it is possible to obtain the difference image by comparing pixels corresponding to each other between the inspection image and the reference image for which positioning has been performed and obtaining the difference value between the pixel values (for example, density values of each of RGB) for each pixel. Next, for the difference image, filter processing for emphasizing a specific shape corresponding to the inspection-target print defect is performed for the difference image. Then, a difference binary image is generated by performing binarization processing for the difference image for which the filter processing has been performed and, based on each pixel value thereof, the presence/absence of the detection-target defect is determined. In a case when a defect is detected by the processing such as this, the inspection item (type of print defect) and the position of the detected defect (position coordinates within the image) are associated with each other and stored in the RAM 107 or the main storage unit 109.

At S305, the inspection results output module 206 displays the inspection results of the inspection item that is set in the preparation processing at S301 on the UI panel 113. The above is the contents of the entire inspection processing that is performed in the image processing unit 118.

<Inspection Area Setting Processing>

Figure 4:
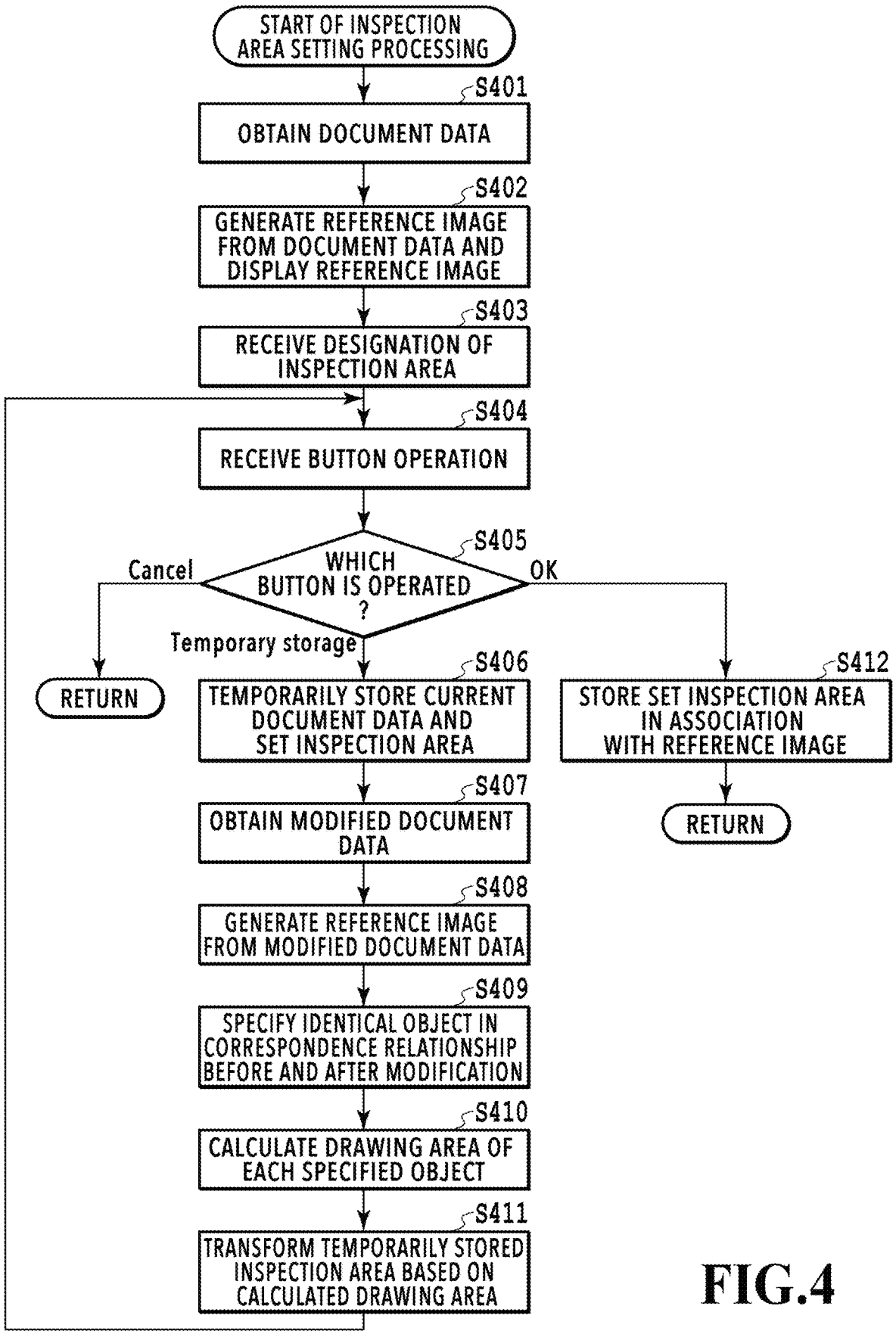
FIG. 4 is a flowchart showing details of inspection area setting processing.

Following the above, inspection area setting processing according to the present embodiment, which is performed as part of the preparation processing (S301) described previously, is explained with reference to the flowchart in FIG. 4. In the following explanation, a symbol "S" means a step.

Figures 5A, 5B:
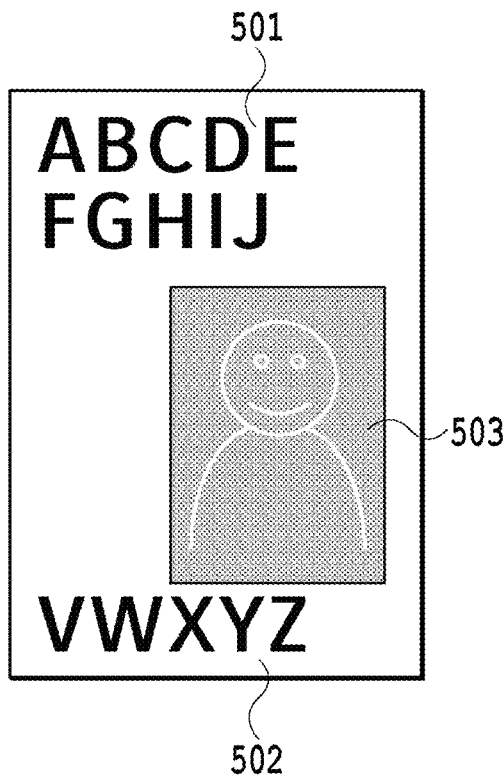
FIG. 5A is a diagram showing an example of a page image and FIG. 5B is a diagram showing an example of a contents stream of a PDF file.

At S401, document data of an inspection-scheduled printed material is obtained. Here, it is assumed that a PDF file of a page image shown in FIG. 5A is obtained as document data from the printing apparatus 102, which includes two text objects 501 and 502 and one image object

503. FIG. 5B shows a contents stream of the PDF file and, for the text objects 501 and 502, the character code, the font type, the font size, and the like, of each character are described, which configures the drawing-target character string. Further, for the image object 503, for example, image data in the JPEG format representing the drawing-target image is described.

Figure 6A:
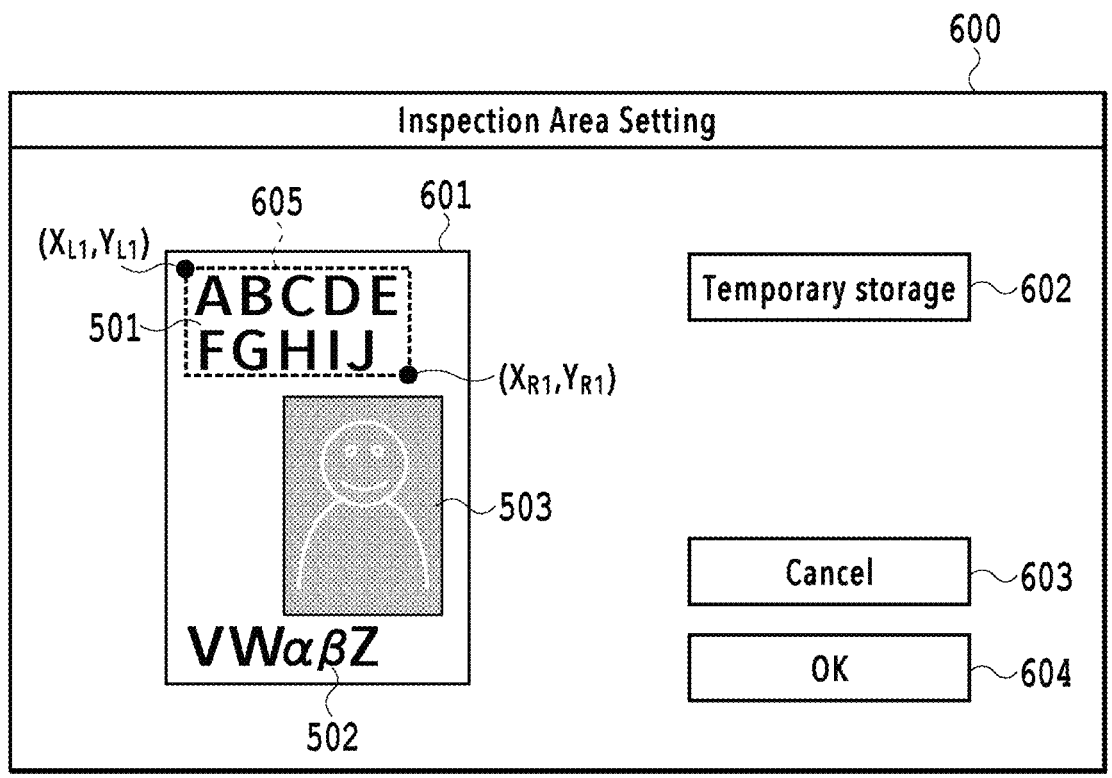
FIG. 6A and FIG. 6B are each a diagram showing an example of an inspection area setting screen.

At S402, a reference image is generated by RIP processing from the document data obtained at S401 and displayed within a user interface screen for inspection area setting (in the following, described as "inspection area setting screen") on the UI panel 113. FIG. 6A is a diagram showing an example of the inspection area setting screen. On an Inspection Area Setting screen 600, a preview area 601, a Temporary storage button 602, a Cancel button 603, and an OK button 604 exist. A reference image generated from the document data is displayed in the preview area 601. The Cancel button 603 is a button for aborting the setting work of the inspection area and the OK button 604 is a button for settling the setting contents of the inspection area. The Temporary storage button 602 will be described later.

At S403, the user operation to designate an area on the page image, which is taken as the inspection area, is received. The Inspection Area Setting screen 600 in FIG. 6A described above represents the state where a user has designated a broken-line range 605 as the inspection area by operating a mouse, or the like, for the text object 501 within the page image in FIG. 5A displayed in the preview area 601.

At S404, the button operation by a user is received and at next S405, the processing is branched in accordance with the contents of the button operation. In a case when the target of the button operation is the Temporary storage button 602, the processing advances to S406 and the information (inspection area information) on the set inspection area designated by a user so far is stored in the RAM 107, or the like, in association with the document data (before modification) in which a user has discovered corruption of text. Table 1 below is an example of the inspection area information and has information on "Area ID" of the designated area and position coordinates (top-left coordinates and bottom-right coordinates) specifying "Position" of the area.

TABLE 1

| Area ID | Position Coordinates |
| --- | --- |
| 1 | $(X_{L1}, Y_{L1}), (X_{R1}, Y_{R1})$ |

In a case when the target of the button operation is the OK button 603, the processing advances to S412 and, after processing to settle and to store the inspection area set by a user in the preview area 601 is performed, this flow is exited. In a case when the target of the button operation is the Cancel button 603, this flow is exited.

Here, for example, it is assumed that a user having completed the setting work until the state in FIG. 6A described previously is brought about discovers RIP trouble of corruption of text ("XY" is erroneously transformed into "αβ") in a case of making an attempt to designate the inspection area similarly for the text object 502 following the above. The RIP trouble such as this occurs in a case when the designated font type is a font type that the mounted RIP cannot deal with, and the like. A user having noticed the corruption of text such as this selects the Temporary storage button 602 provided within the Inspection Area Setting screen 600. Due to this, the inspection area information corresponding to the work contents so far, that is, the information representing the set inspection area as shown in Table 1 described above is stored in the RAM 107, or the like. Then, the user having selected the Temporary storage button 602 performs modification for preventing corruption of text from occurring for the document data (here, PDF file). FIG. 7B shows a PDF file after a user performs modification for the PDF file in FIG. 5B, and in this example, the font type of the text objects 501 and 502 is changed from "F1" to "F2". The modification such as this for the document data is performed by a user.

At S407 that follows, the document data for which modification has been performed (in the following, called "modified document data") is obtained. For example, the modified document data is obtained by a user uploading the modified PDF file shown in FIG. 7B described previously from a client terminal, not shown schematically.

At S408, a reference image is generated by RIP processing from the modified document data obtained at S407. FIG. 7A shows a page image as the reference image, which is generated from the modified PDF file shown in FIG. 7B. In a text object 502' within the page image in FIG. 7A, no corruption of text occurs, but the character in a text object 501' and the text object 502' becomes one size larger due to the change of the font type.

At S409, based on the document data stored temporarily at S406 and the modified document data obtained at S407, the identical object in the correspondence relationship before and after the modification is specified. In this case, as regards the text object, the mismatch of the font type and font size is included in the category of "identical object". However, in a case when the character code is different or the number of characters is different, the text objects are determined to be separate text objects and not handled as "identical object" in the correspondence relationship before and after the modification.

Figure 8A:
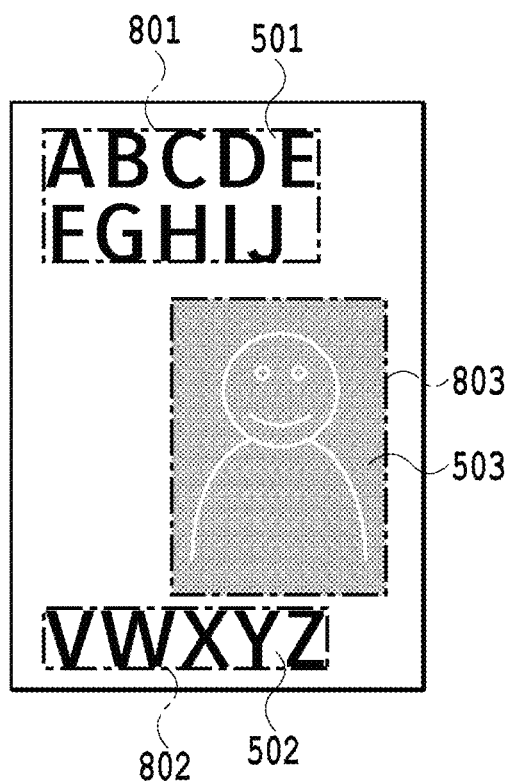
FIG. 8A and FIG. 8B are each a diagram showing a drawing area of each object.
Figure 8B:
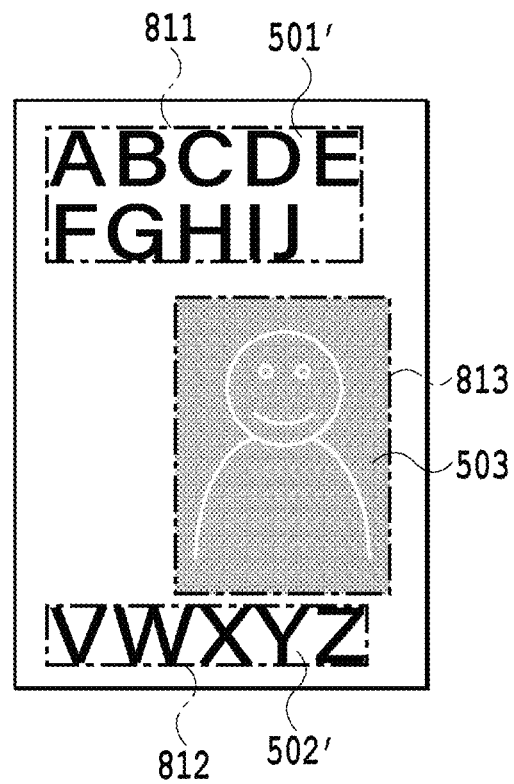

At S410, for each specified identical object, a drawing area in the page image represented by the modified document data is calculated. In a case of the text object, the drawing area is calculated from the glyph width of each character and drawing position origin information of each character. FIG. 8A shows the drawing areas of the there objects 501 to 503 designated in the PDF file before the modification shown in FIG. 5B by one-dot chain lines 801 to 803. FIG. 8B shows the drawing areas of the three objects 501', 502', and 503 designated in the PDF file after the modification shown in FIG. 7B by one-dot chain lines 811 to 813. Because of the change of the font type, the drawing areas 811 and 812 of the modified text objects 501' and 502' extend in the horizontal direction and become larger than the drawing areas 801 and 802 of the text objects 501 and 502 before the modification. On the other hand, the image object 503 does not change and the drawing area 813 is the same as the drawing area 803.

Figure 6B:
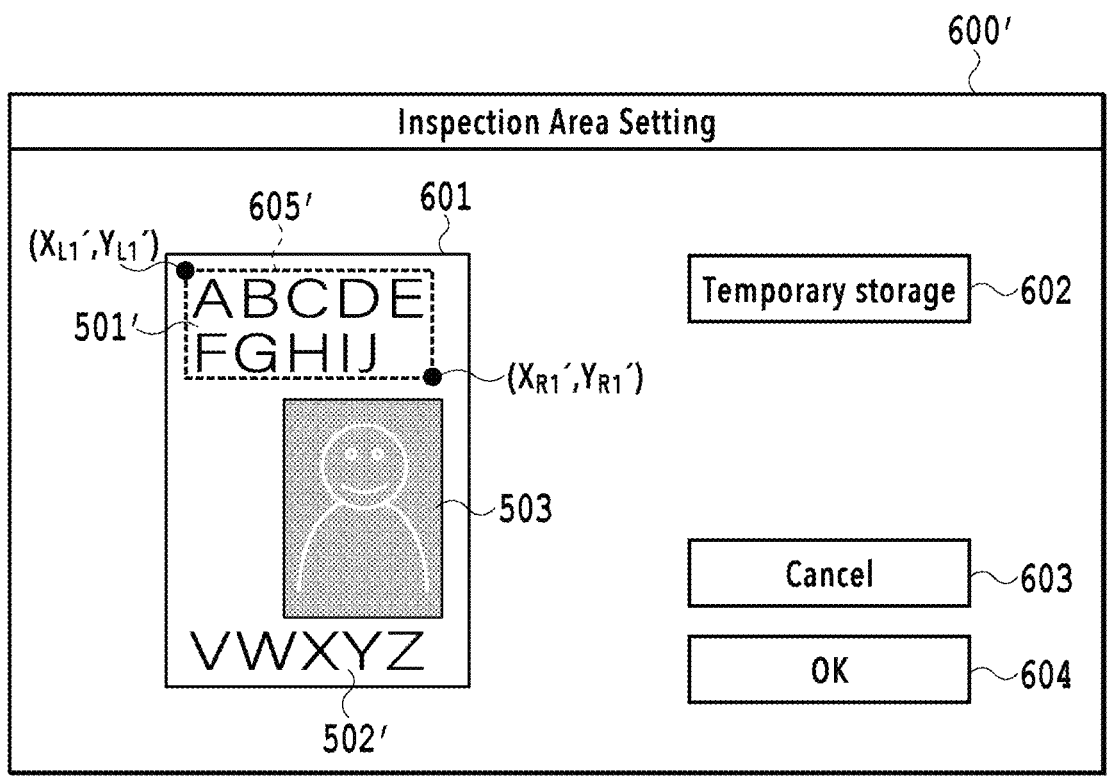

At S411, based on the drawing area of each object, which is calculated at S410, the inspection area temporarily stored at S406 is transformed. That is, in accordance with the drawing area calculated at S410, transformation processing to enlarge/reduce the set inspection area temporarily stored is performed. Then, the transformed inspection area is presented to a user on the Inspection Area Setting screen described previously. FIG. 6B is a diagram showing an Inspection Area Setting screen 600' displaying the transformed inspection area in the preview area 601. In the preview area 601 on the Inspection Area Setting screen 600' in FIG. 6B, a reference image generated from the modified document data is displayed. Then, for the text object 501' whose font type has been changed, an inspection area enlarged so as to include the drawing area 811 (see FIG. 8B) is shown in a broken-line range 605'. Due to this, it is possible for a user to check the inspection area [($X_{L1}'$, $Y_{L1}'$), ($X_{R1}'$, $Y_{R1}'$)] automatically adjusted as described above in accordance with the modified document data. Then, the inspection area information in Table 1 described previously is also updated as in Table 2 below.

TABLE 2

| Area ID | Position Coordinates |
|---------|----------------------|
| 1 | ($X_{L1}'$, $Y_{L1}'$), ($X_{R1}'$ $Y_{R1}'$) |

After the display processing such as this, the processing returns to S404. Then, in a case when the OK button 604 is operated by a user having checked that there is no problem in the inspection area after being transformed by the automatic adjustment, the inspection area is set with the transformed contents (S412 through S405).

The above is the contents of the inspection area setting processing according to the present embodiment. In the present embodiment, the target of modification in document data is a text object, but it may also be possible to perform modification by taking an image object or a graphics object as a target. In the case such as that also, it is sufficient to similarly transform the inspection area in accordance with the drawing area calculated from modified document data. Specifically, as will be explained in the second embodiment, it is sufficient to perform transformation (geometrical conversion) while maintaining the identity of the target image or graphics. At this time, in a case when the transformed inspection area overlaps the set inspection area of another object, it may also be possible to warn a user by highlighting the portion, and the like. It is possible to control to switch between adding/deleting (extending/reducing) the set inspection area and performing geometrical conversion in accordance with, for example, the object attribute of the inspection area information, which will be described in the second embodiment, to be described later. Specifically, in a case when the object attribute is image or graphics other than text, geometrical conversion is performed, and so on.

Modification Example 1

In the present embodiment, an inspection area is set for a reference image generated from document data, but this is not limited. For example, it may also be possible to enable a user to designate an inspection area by displaying a raster image obtained by a simpler rendering method in the preview area 601. In this case, the drawing position in the raster image displayed in the preview area 601 is regarded as the drawing position in the reference image and the area designated by a user is associated with the inspection area and set as the inspection area. In this case also, it is sufficient to similarly adjust the inspection area automatically in accordance with the modification of the document data.

As above, according to the present embodiment, in a case when corruption of text, or the like, is discovered after setting the inspection area for a certain object existing within a page image and the document data is modified, the set inspection area is adjusted automatically in accordance with the modification contents of the document data. Due to this, it is possible to reduce the burden of a user to perform again the setting work of the inspection area, which accompanies the modification of the document data.

Second Embodiment

In the first embodiment, the example is explained in which the inspection area that is set already for a text object is adjusted automatically in accordance with the change of the drawing area caused by a user having discovered corruption of text changing the font type of the text object in the document data. Next, an aspect is explained as the second embodiment in which, in accordance with the modification of document data performed for a certain text object, the set inspection area of another object that is affected by the modification is also adjusted automatically. Explanation of the contents common to those of the first embodiment, such as the system configuration, is omitted and, in the following, inspection area setting processing according to the present embodiment is explained along the flowchart in FIG. 4 described previously, with different points from the first embodiment mainly being focused on.

<Inspection Area Setting Processing>

S401 and S402 are the same as those of the first embodiment and, first, printing processing-target document data is obtained and a reference image is generated from the obtained document data. Then, at S403, a user operation to designate an inspection area for the reference image displayed on the inspection area setting screen is received. Here, it is assumed that, after the broken-line range 605 is designated for the text object 501 within the page image, further, broken-line ranges 901 and 902 are designated respectively as an inspection area for the image object 503 as shown on an Inspection Area Setting screen 900. By the broken-line range 901, the whole of the image object 503 is designated as an inspection area and, by the broken-line range 902, the face within the image object 503 is designated as another inspection area. The designation such as this is performed in a case when it is desired to make different the inspection item and the inspection level for each region of one object. Then, it is assumed that a user having completed the designation so far discovers corruption of text (erroneous transformation in which "XY" is transformed into "αβ") at the time of subsequently attempting to designate an inspection area also for the text object 502 and selects the Temporary storage button 602. By this, the inspection area information indicating the set inspection area designated by the user until that time is stored in the RAM 107, or the like, in association with the document data (before modification) in which the user has discovered the corruption of text. Table 3 below is an example of inspection area information according to the present embodiment and information on "Object Attribute" is included, in addition to information on "Area ID" of the designated area and position coordinates (top-left coordinates and bottom-right coordinates) specifying "Position" of the area.

TABLE 3

| Area ID | Object Attribute | Position Coordinates |
|---------|------------------|----------------------|
| 1 | Text | ($X_{L1}$, $Y_{L1}$), ($X_{R1}$, $Y_{R1}$) |
| 2 | Image | ($X_{L2}$, $Y_{L2}$), ($X_{R2}$, $Y_{R2}$) |
| 3 | Image | ($X_{L3}$, $Y_{L3}$), ($X_{R3}$, $Y_{R3}$) |

Figure 10A:
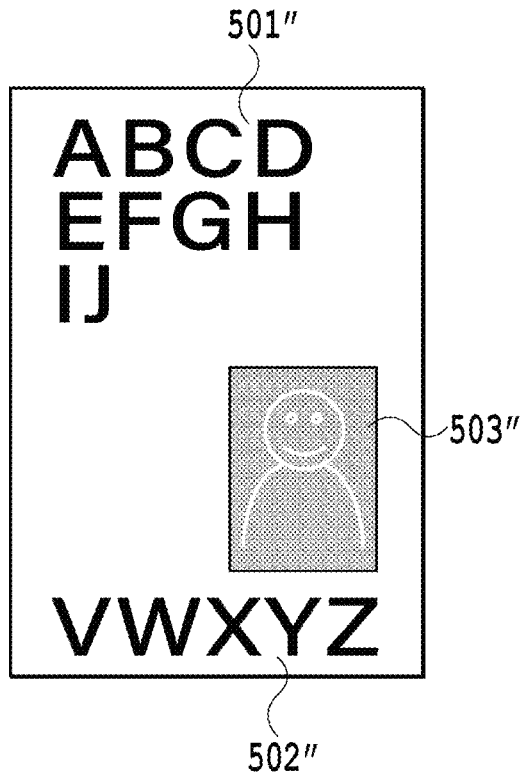
FIG. 10A is a diagram showing an example of a page image and FIG. 10B is a diagram showing a contents stream of a PDF file.
Figure 10B:
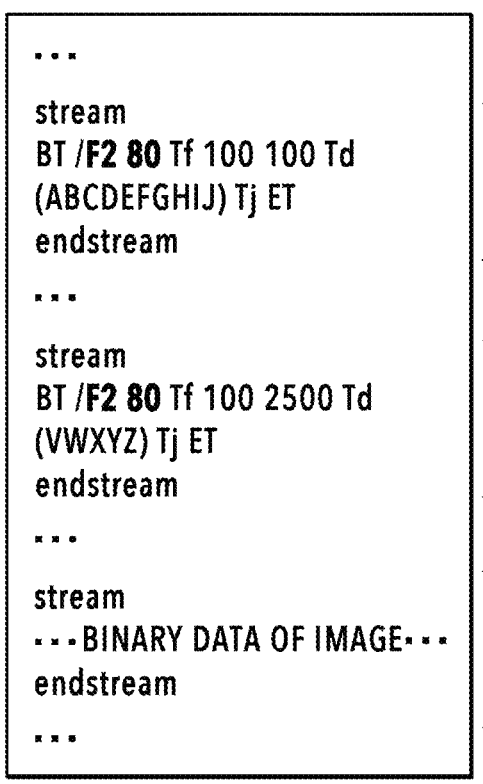

Then, the user having selected the Temporary storage button 602 performs modification for preventing corruption of text from occurring for the document data (here, PDF file). FIG. 10B shows the PDF file after the user performs modification for the PDF file in FIG. 5B. In this example, the font type of the text objects 501 and 502 is changed from "F1" to "F2", and further, the font size is changed from "50" to "80".

S404 and S405 are the same as those of the first embodiment and the processing is branched based on the reception of the button operation by the user and the contents of the received button operation. Then, at S406, in a case when the Temporary storage button 602 is operated, information on the inspection area that is already set at the point in time at which the button operation is performed is stored in the RAM 107, or the like, in association with the document data and at next S407, modified document data is obtained. Here, it is assumed that the modified document data is obtained by, for example, the user uploading the PDF file shown in FIG. 10B described previously from a client terminal, not shown schematically.

S408 is the same as that of the first embodiment and a reference image is generated by RIP processing from the modified document data obtained at $407. FIG. 10A shows a page image as the reference image, which is generated from the modified PDF file shown in FIG. 10B. In a text object 502" within the page image in FIG. 10A, corruption of text does not occur because of the change of the font type. Then, by the change of the font type and the font size, each character in a text object 501" and, in the text object 502" is enlarged in size. Further, in the text object 501", the number of lines is increased from two to three as well as the position at which the line ends (or the next line starts) is changed. Further, although the image data itself of an image object 503" does not change, the display size thereof within the page image is reduced by layout adjustment, to be described later.

S409 is also the same as that of the first embodiment and, based on the document data temporarily stored at S406 and the modified document data obtained at S407, the identical object in the correspondence relationship before and after the modification is specified.

Figure 11A:
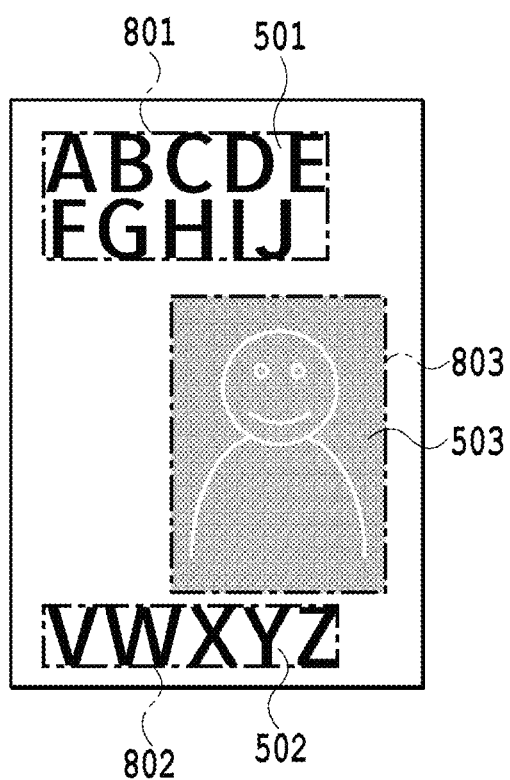
FIG. 11A and FIG. 11B are each a diagram showing a drawing area of each object.
Figure 11B:
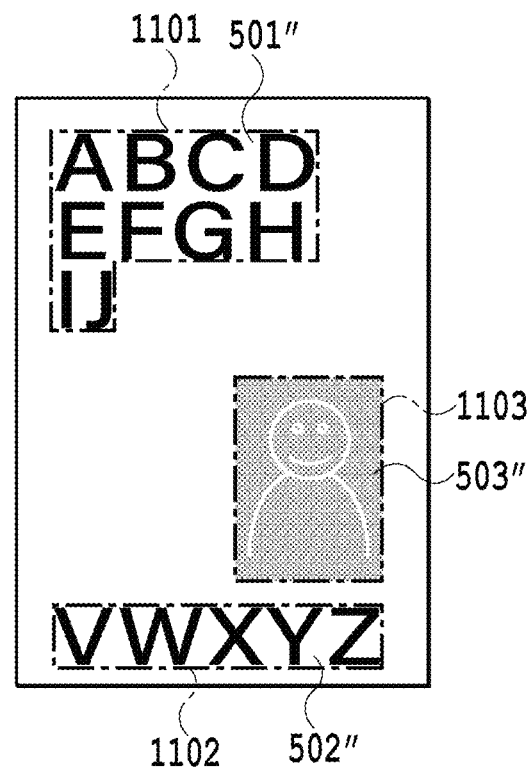

At S410, for each of the specified objects, the drawing area on the page represented by the modified document data is calculated. At this time, as described previously, for the text object, the drawing area is calculated from the glyph width of each character and the drawing position origin information on each character. Then, for the image object, the drawing area is calculated from the coordinate information indicating the drawing position described within the contents stream. Here, it is necessary to determine the drawing area of each object so that the drawing area is included within the area except for the margin designated for the printing-target page (printable area), and, therefore, layout adjustment to this end is performed as needed. For example, adjustment is performed because the drawing area of a certain text object becomes large due to the change of the font so that the drawing area of another object is reduced. Then, this layout adjustment is performed in such a manner that the position relationship between the objects is maintained. FIG. 11B shows the drawing areas of the three objects 501" to 503" designated by the modified PDF file shown in FIG. 10B by one-dot chain lines 1101 to 1103. By the change of the font type and the font size, first, not only does the drawing area 1101 of the modified text object 501" become larger than the drawing area 801 (see FIG. 11A) of the text object 501 before the modification, but the shape also changes. Further, the drawing area 1102 of the modified text object 502" becomes larger than the drawing area 802 (see FIG. 11A) of the text object 502 before the modification. Accompanying this, the drawing area 1103 of the modified image object 503" becomes considerably smaller than the drawing area 803 (see FIG. 11A) before the modification due to the layout adjustment while maintaining the position relationship between the drawing areas.

Figure 9A:
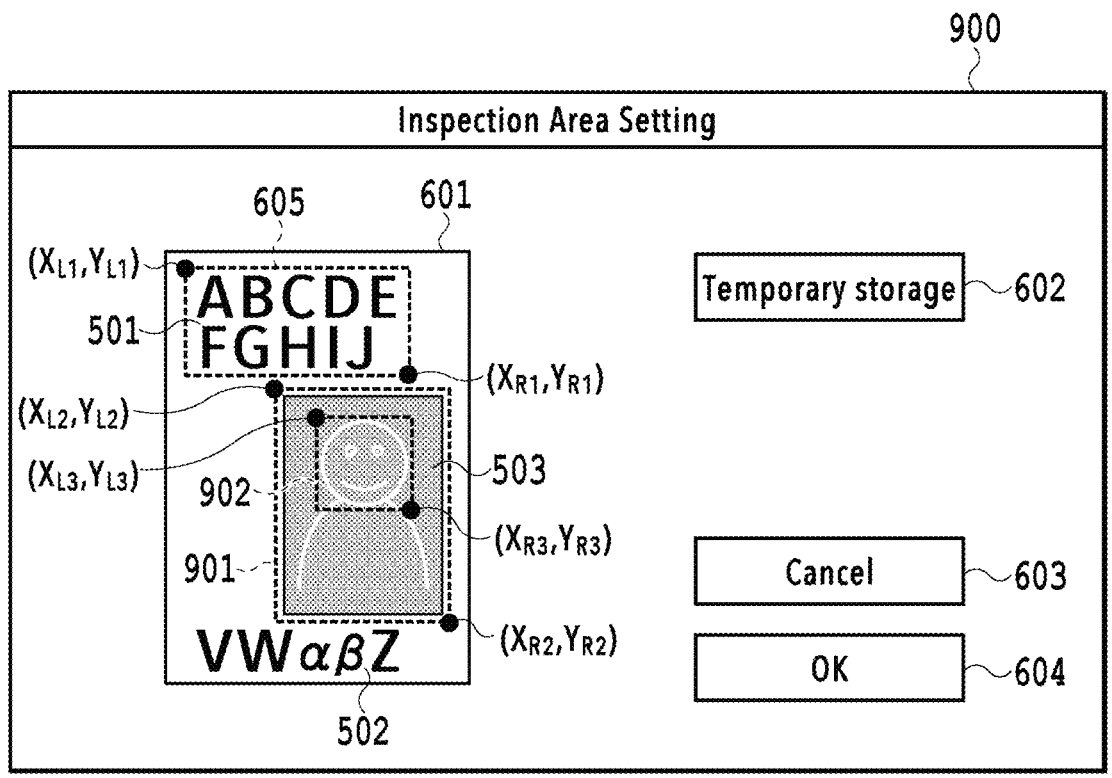
FIG. 9A and FIG. 9B are each a diagram showing an example of an inspection area setting screen.
Figure 9B:
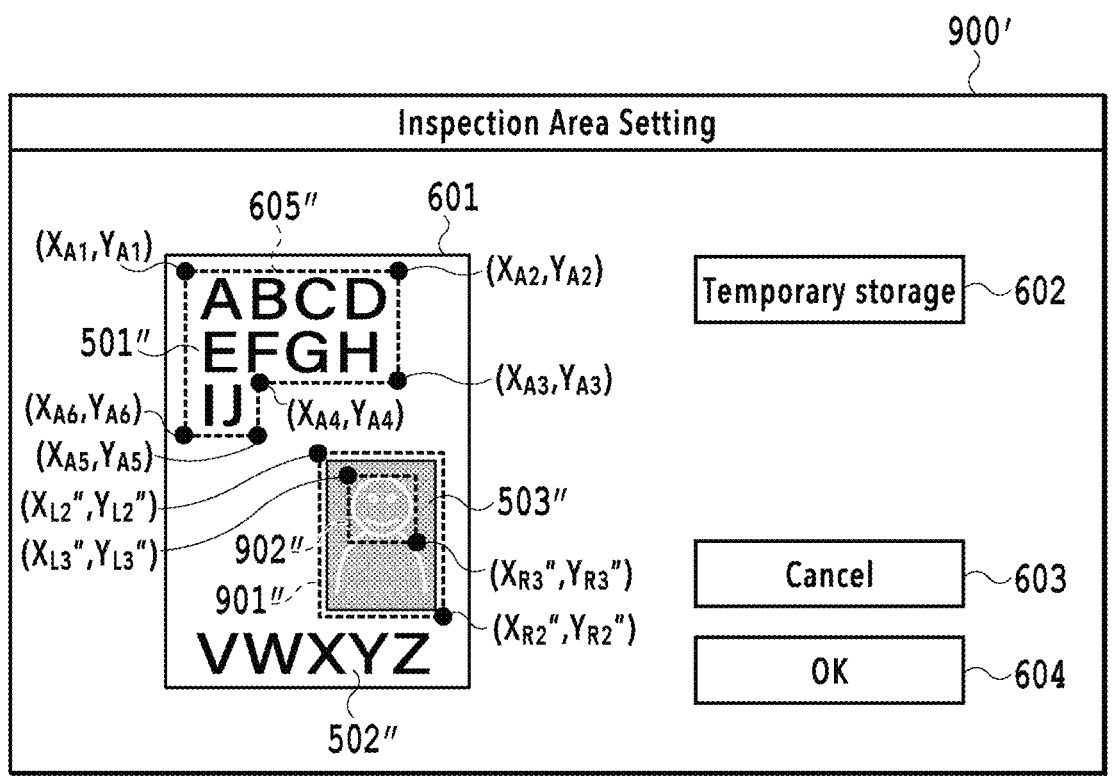

At S411, based on the drawing area of each object, which is calculated at S410, the set inspection area temporarily stored at S406 is transformed. At this time, the set inspection area stored temporarily is transformed so that the position relationship between the drawing area of each object is maintained. Here, it is assumed that the set inspection area in the state in FIG. 9A is stored temporarily. In this case, first, the drawing area 1101 of the text object 501" becomes large by the change of the font type and the font size. Consequently, transformation processing to enlarge the inspection area [$(X_{L1}, Y_{L1}), (X_{R1}, Y_{R1})$] indicated by the broken line 605 of the text object 501" to an inspection area [$(X_{A1}, Y_{A1}), (X_{A2}, Y_{A2}), (X_{A3}, Y_{A3}), (X_{A4}, Y_{A4}), (X_{A5}, Y_{A5})$] indicated by a broken line 605" is performed. Further, by the layout adjustment, the drawing area 1103 of the image object 503" becomes small, and, therefore, transformation processing to reduce also the corresponding inspection area [$(X_{L2}, Y_{L2}), (X_{R2}, Y_{R2})$] indicated by the broken line 901 to an inspection area [$(X_{L2}', Y_{L2}'), (X_{R2}', Y_{R2}')$] indicated by a broken line 901" is performed by geometrical conversion. Then, accompanying this, the inspection area whose target is the portion of the face of the image object 503" is also reduced while maintaining the relative position relationship for the entire object. That is, the inspection area [$(X_{L3}, Y_{L3}), (X_{R3}, Y_{R3})$] indicated by the broken line 902 is reduced to an inspection area [$(X_{L3}', Y_{L3}'), (X_{R3}', Y_{R3}')$] indicated by a broken line 902". Then, as in the first embodiment, the transformed inspection area is displayed in the preview area 601 on the Inspection Area Setting screen being displayed on the UI panel 113. FIG. 9B is a diagram showing an Inspection Area Setting screen 900' on which the transformed inspection area is displayed in the preview area 601. In the preview area 601 on the Inspection Area Setting screen 900' in FIG. 9B, the reference image generated from the modified document data is displayed and an inspection area [$(X_{A1}, Y_{A1}), \ldots, (X_{A5}, Y_{A5})$] transformed so as to include the drawing area 1101 is indicated by a broken line 605". Further, for the image object 503", an inspection area [$(X_{L2}', Y_{L2}'), (X_{R2}', Y_{R2}')$] changed so as to include the reduced drawing area 1103 and an inspection area [$(X_{L3}', Y_{L3}'), (X_{R3}', Y_{R3}')$] reduced in accordance therewith are indicated by the broken lines 901" and 902", respectively. Due to this, it is possible for a user to check the inspection area automatically adjusted in accordance with the modified document data. Then, the inspection area information in Table 3 is updated to that as in Table 4 below.

TABLE 4

| Area ID | Object Attribute | Position Coordinates |
| --- | --- | --- |
| 1 | Text | $(X_{A1}, Y_{A1}), \ldots, (X_{A5}, Y_{A51})$ |
| 2 | Image | $(X_{L2}', Y_{L2}'), (X_{R2}', Y_{R2}')$ |
| 3 | Image | $(X_{L3}', Y_{L3}'), (X_{R3}', Y_{R3}')$ |

In a case when the changed inspection area is displayed in the preview area 601, it may also be possible to notify a user of the changed portion by, for example, displaying a message to give a notification that the position and size of the image object for which modification has not been performed are changed by layout adjustment. After the display processing such as this, the processing returns to S404 and, in a case when the OK button 604 is operated by the user having checked that there is no problem in the changed inspection area, the inspection area is set with the changed contents (S412 through S405).

The above is the contents of the inspection area setting processing according to the present embodiment. In the present embodiment, the case is explained where, by the modification of the text object, the inspection area of the image object that is not modified is incidentally adjusted automatically, but the attribute of the object that is the target of the incidental automatic adjustment such as this is not limited to image and, for example, graphics may be taken as the target. Further, in a case when one of the temporarily stored set inspection areas is the inspection area that is not affected by layout adjustment, for example, in a case when the inspection area corresponds to the preprint area (area on the sheet in which a logo, or the like, is printed in advance), it may also be possible to perform setting so that the inspection area is excluded from the target of automatic adjustment.

Modification Example

Figure 12:
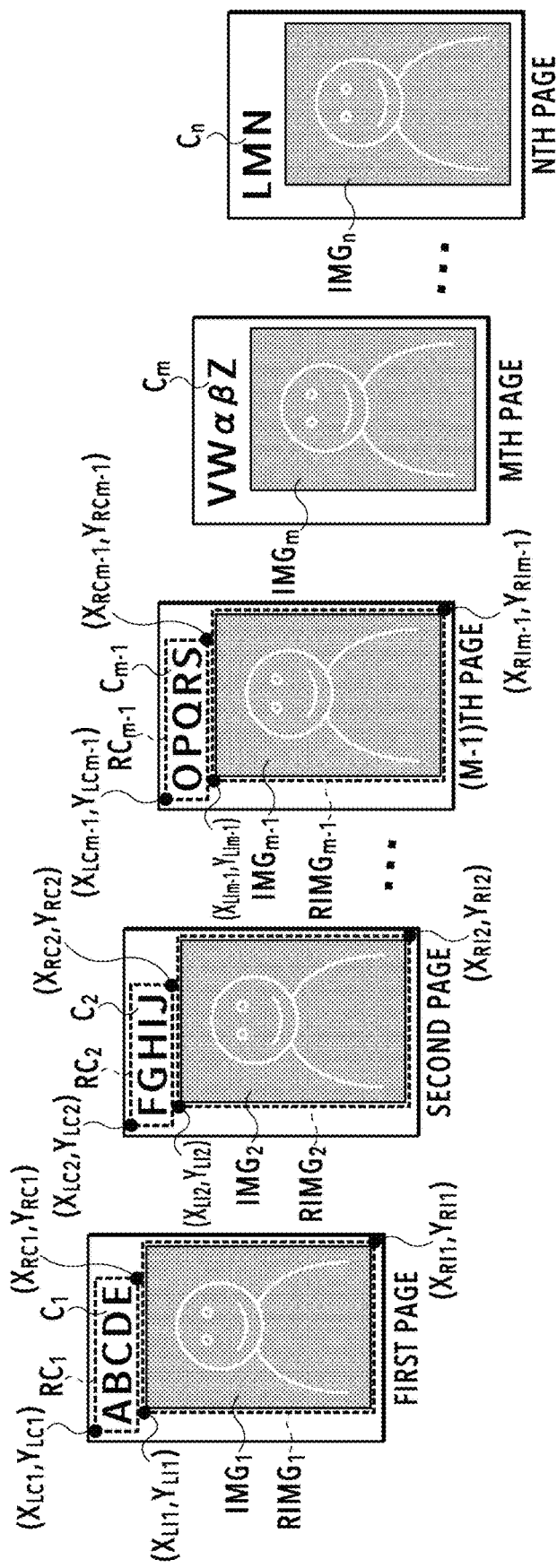
FIG. 12 is a diagram explaining setting of an inspection area of multi-page document data.

In the first and second embodiments, the aspect is explained in which the document data of one page is modified and the inspection area corresponding thereto is adjusted automatically, but it is also possible to apply the first and second embodiments similarly to an arbitrary page within document data of a plurality of pages. FIG. 12 is a diagram explaining the setting of the inspection area in this modification example, showing document data corresponding to n pages, each page including a text object and an image object. Objects are arranged so that the first page includes a character string $C_1$ and an image $I_1$, the second page includes a character string $C_2$ and an image $I_2$, . . . , and the nth page includes a character string $C_n$ and an image $I_n$. Then, it is assumed that a user designates ranges $RC_1$, $RC_2$, . . . , $RC_{m-1}$ indicated by broken lines as the inspection areas for the text objects of the document data of the first page to the (m−1)th page among the document data corresponding to the n pages via the Inspection Area Setting screen described previously and further, the user designates ranges $RI_1$, $RI_2$, . . . , $RI_{m-1}$ indicated by broken lines as the inspection areas for the image objects. Here, m is a positive integer that satisfies 1<m<n. Then, it is further assumed that the user finds corruption of text in a case of making an attempt to designate the inspection area similarly for the character string $C_m$ of the mth page and aborts the setting work of the inspection area and selects the Temporary storage button. In a case of this modification example, it is sufficient to temporarily store inspection area information that associates each inspection area and the page number at this point in time as shown in Table 5 below.

TABLE 5

| Area ID | Page No. | Object Attribute | Position Coordinates |
|---------|----------|------------------|----------------------|
| $C_1$ | 1 | Text | $(X_{LC1}, Y_{LC1})$, $(X_{RC1}, Y_{RC1})$ |
| $I_1$ | 1 | Image | $(X_{LI1}, Y_{LI1})$, $(X_{RI1}, Y_{RI1})$ |
| $C_2$ | 2 | Text | $(X_{LC2}, Y_{LC2})$, $(X_{RC2}, Y_{RC2})$ |
| $I_2$ | 2 | Image | $(X_{LI2}, Y_{LI2})$, $(X_{RI2}, Y_{RI2})$ |
| . | . | . | . |
| . | . | . | . |
| . | . | . | . |

TABLE 5-continued

| Area ID | Page No. | Object Attribute | Position Coordinates |
|---------|----------|------------------|----------------------|
| $C_{m-1}$ | m − 1 | Text | $(X_{LCm-1}, Y_{LCm-1})$, $(X_{RCm-1}, Y_{RCm-1})$ |
| $I_{m-1}$ | m − 1 | Image | $(X_{LIm-1}, Y_{LIm-1})$, $(X_{RIm-1}, Y_{RIm-1})$ |

Then, the user performs the same modification as that in the first and second embodiments for the document data of the mth page and uploads the modified document data. By this, it is made possible to perform automatic adjustment as in the first and second embodiments also for the temporarily stored set inspection area for an arbitrary page in the multipage document data.

As above, according to the present embodiment, in accordance with the modification performed for document data by a user having discovered corruption of text, and the like, in a certain text object, it is possible to perform automatic adjustment also for the set inspection area of another object that is affected by the modification.

Other Embodiments

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

According to the present disclosure, it is possible to reduce the burden of a user to perform again the setting work of an inspection area accompanying modification of document data.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing apparatus comprising:
one or more memories storing instructions; and
one or more processors executing the instructions:
to obtain document data before printing;
to set an inspection area that is an inspection target for an image represented by the obtained document data;
to update, in a case when the document data is modified, the set inspection area based on the modified document data; and
to generate, based on the modified document data, a reference image for inspection of a printed material.

2. The image processing apparatus according to claim 1, wherein the set inspection area is stored in association with the document data.

3. The image processing apparatus according to claim 1, wherein, in the updating, the set inspection area is transformed based on the modified document data.

4. The image processing apparatus according to claim 1, wherein, in the setting, an area on the image, designated by a user via a user interface screen, is set as the inspection area, and
the transformed inspection area, which is transformed in accordance with the modified document data, is displayed on the user interface screen.

5. The image processing apparatus according to claim 4, wherein, in the setting, in accordance with instructions by a user via the user interface screen, the inspection area that is already set at the point in time of the instructions is stored in association with the document data.

6. The image processing apparatus according to claim 1, wherein, in the updating:
an identical object in a correspondence relationship is specified by comparing an object included in the image represented by the document data and an object included in an image represented by the modified document data area;
for each specified identical object, a drawing area in the image represented by the modified document data is calculated; and
based on the calculated drawing area, the set inspection area is transformed.

7. The image processing apparatus according to claim 6, wherein the object included in the image is a text object whose attribute is text, and,
in a case when an inspection area of the text object is included in the set inspection area and a font of a character string represented by the text object is modified in the modified document data, in the updating:
in a case when a drawing area of the text object is enlarged by modification of the font, the set inspection area is transformed in accordance with the enlarged drawing area; and
in a case when the drawing area of the text object is reduced by modification of the font, the set inspection area is transformed in accordance with the reduced drawing area.

8. The image processing apparatus according to claim 7, wherein, in the updating, the set inspection area of the text object is transformed based on a glyph width of each character configuring the character string represented by the text object and drawing position origin information.

9. The image processing apparatus according to claim 8, wherein, in a case when another object having an attribute other than text is further included in the image, on a condition that an inspection area of the other object is further included in the set inspection area, in the updating:
in a case when the drawing area of the text object changes by modification of the font, the set inspection area of the other object is transformed by geometrical conversion so that a position relationship between the drawing area having changed and the drawing area of the other object is maintained.

10. The image processing apparatus according to claim 9, wherein the other object is an image object whose attribute is an image or a graphics object whose attribute is graphics.

11. The image processing apparatus according to claim 1, wherein, in the updating, in a case when the set inspection area is an inspection area of a preprint area, the updating is not performed.

12. The image processing apparatus according to claim 1, wherein, in a case when images corresponding to a plurality of pages are included in the document data, the set inspection area is stored in association with a page number of a corresponding image, and,
in a case when the document data is modified, in the updating, the set inspection area stored in association with the page number is transformed in accordance with the image of the page number in the modified document data.

13. The image processing apparatus according to claim 1, wherein, in the generating, the reference image is generated without printing based on the document data.

14. The image processing apparatus according to claim 1, wherein, in the generating, the reference image is generated by Raster Image Processor.

15. The image processing apparatus according to claim 1, wherein the document data is Page Description Language data.

16. An image processing method comprising the steps of:
obtaining document data before printing;
setting an inspection-target inspection area for an image represented by the obtained document data;
updating, in a case when the document data is modified, the set inspection area based on the modified document data; and
generating, based on the modified document data, a reference image for inspection of a printed material.

17. A non-transitory computer readable storage medium storing a program for causing a computer to perform an image processing method comprising the steps of:
obtaining document data before printing;
setting an inspection-target inspection area for an image represented by the obtained document data;
updating, in a case when the document data is modified, the set inspection area based on the modified document data; and
generating, based on the modified document data, a reference image for inspection of a printed material.

* * * * *